UNITED STATES PATENT OFFICE 2,355,661

EXTRACTION OF STEROLS

Robert F. Light, Mount Vernon, Herbert Kothe, Bronx, and Charles N. Frey, Scarsdale, N. Y., assignors to Standard Brands Incorporated, New York, N. Y., a corporation of Delaware No Drawing. Application March 21, 1941,
Serial No. 384,582

6 Claims. (Cl. 260—397.2)

The invention relates to a method for the extraction of a sterol. More particularly, it pertains to the extraction of ergosterol, and includes correlated improvements and discoveries whereby such extraction may be accomplished.

An object of the invention is to provide a method whereby a sterol may be effectively separated from a material with which it is associated.

A further object of the invention is the provision of a procedure in accordance with which a sterol is separated from a material containing it through the action of a caustic alkali and an alcohol.

Another object of the invention is to bring about a separation of a sterol in a manner which may be readily, economically and efficiently carried out on a commercial scale.

A distinctive object of the invention is to effect a separation of ergosterol from a natural source material when the greater portion of ergosterol is in a combined state and only a small portion is in free or uncombined state.

An additional object of the invention is the provision of a method whereby ergosterol may be effectively separated from yeast.

A specific object of the invention is to provide a manner in which ergosterol may be separated from yeast through a treatment which entails utilization first of an alkali whereby the yeast is liquefied, and the combined ergosterol is released through hydrolysis by alkali and heat, and then of an alcohol which serves to extract ergosterol from the liquid and saponified mass.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention a sterol may be extracted or separated from a sterol-containing material by treatment with a causic alkali which brings about a liquefaction of the material, and saponification and hydrolysis, and then extracting the free sterol from thus liquefied mass with alcohol. Extraction may be followed by crystallization of sterol from the extract which is so produced. Liquefaction of the sterol-containing material is occasioned by admixture thereof with caustic alkali, for example, caustic soda and caustic potash in an amount of from 5 to 15% of the material undergoing treatment. In order to facilitate the liquefying process the admixture may be suitably agitated. When the mass has liquefied it may be cooked or heated, as by means of steam under a pressure of 15 pounds per square inch to bring about release of sterol. The heating may be at a temperature of from 90 to 110° C., specifically from 96 to 104° C. for a period of several hours, such as three hours, whereupon the liquefied mass is cooled with a temperature drop of 2 to 6° C.

To the cooled mass there is now added a suitable sterol solvent which is miscible with water and unaffected by alkali, as an alcohol, e. g., ethyl alcohol having a concentration of from about 93 to 95%, and the mixture is then heated for a period which may be about 45 minutes at a temperature of about 78 to 80° C. The heating preferably is conducted under refluxing conditions in order that the alcohol which is vaporized may be condensed and returned to the treatment. Extraction of sterol is effected by the alcohol, and when the heating has continued for about thirty to forty-five minutes the suspended material is allowed to settle by permitting the mass to stand for a suitable period, which may be upwards from thirty minutes. As a result of the settling the mass separates into a cleared supernatant liquor containing extracted sterol and a sludge or settled bed of suspended material. The cleared supernatant liquor may be withdrawn by decantation, and sterol is obtained therefrom through crystallization. This is facilitated by cooling the cleared supernatant liquor, as to a temperature of about 25° C., and crystallized sterol may be removed in a suitable manner, as by filtering by means of a filter press.

The alcohol which has been separated from the crystallized sterol may be admixed with the settled materials in order to bring about a further or second extraction of sterol. This procedure is a repetition of that just described, and leads to obtainment of a second quantity of crystallized sterol. Moreover, the alcohol coming from the second separation of crystallized sterol may be again returned to the settled material in order to accomplish a third extraction, of which the steps are as above given. It has been found that extraction beyond a third extraction is not attended by a sufficient yield of crystallized sterol to justify its carrying through if the volumes of solvent, alkali and ergosterol source material are properly adjusted.

When ergosterol is extracted from yeast the yeast is liquefied by admixture with caustic alkali, which is followed by cooking to release the ergosterol, and the other procedural steps given hereinabove, whereupon there results a crystallization of ergosterol with subsequent obtention of the ergosterol as by filtration.

As an illustrative embodiment of a manner in which the process may be practiced the following description setting forth extraction of ergosterol from yeast is presented.

Yeast, in the usual pressed form, i. e., containing about 70% of water, is admixed with caustic soda in an amount of about 15% by weight of the yeast. The yeast and caustic soda are placed in a mixer provided with an agitator and mixing is continued until complete liquefaction obtains. Then the liquefied mass is introduced into a vessel provided with means for agitation, and also for heating. When the mass has been placed in the cooking vessel it is heated therein by means of steam under a pressure of about 15 pounds per square inch, and this cooking is continued for a period of about three hours, whereupon the yeast fat is disintegrated or saponified with release of ergosterol. The temperature at which the liquefied mass is heated may be from about 90° to 110° C., or more especially 96° to 104° C. In order to maintain volume the cooking vessel is attached to a suitable condenser which permits a refluxing action.

After about a three hour period the heating and agitation are discontinued and the mass is permitted to cool with a temperature drop of from about 2° to 6° C. This usually requires about ten minutes and is desirable in order to obviate undue action during the subsequent treatment which involves addition of alcohol. The initial charge may consist of about 27½ pounds of yeast together with about 4.2 pounds of caustic soda. To the liquefied and cooled mass there may be added about 4.5 gallons of denatured alcohol having a concentration from about 93 to 95%. A rather vigorous reaction takes place for about five minutes, and when the alcohol has been added heating may be effected by steam with attending agitation. Retention of alcohol is accomplished by condensation of vapors and return of the condensate to the reaction mass. The mass is heated for about forty-five minutes during which the temperature rises to about 78 to 80° C., and thereby the alcohol dissolves the ergosterol with separation from the yeast.

A dilution of the alcohol to about 50 to 60% takes place due to the water content of the yeast. After the mass has been heated for forty-five minutes the suspended materials are allowed to settle, and this requires a period upwards from about thirty minutes. As a result of the settling there is obtained a sludge of suspended material and a cleared supernatant liquor having an alcoholic solution of ergosterol. This cleared supernatant liquor is separated from the sludge in a suitable manner, as by decantation, while hot, and crystallization of ergosterol from cleared supernatant liquor takes place as a result of cooling, as by means of brine, to a temperature of about 25° C. Lowering of the temperature brings about a decrease in the solubility of ergosterol with crystallization thereof, and the thus crystallized ergosterol may be removed from the mother liquor, as by filtration through a filter press.

There is thus obtained a mass of crystallized ergosterol and a liquor or filtrate of the alcohol which occasioned the extraction. This filtrate is utilized by mixing it with the settled material and heating of the admixture for a period of one hour or longer if desired, at a temperature of 76 to 80° C. Following a settling period the cleared supernatant liquor is withdrawn, cooled, and crystallization of a further quantity of ergosterol permitted to take place. The ergosterol so obtained is removed from the liquor as before by means of a filter press. Thus, a second amount of crystallized ergosterol is obtained and an alcoholic filtrate. The filtrate is admixed again with the settled material whereby a third extraction of ergosterol is made. This extraction may continue for an hour or more, with heating and agitation, whereupon suspended material is allowed to settle, as for twenty minutes or more, followed by decantation of cleared supernatant liquor. This liquor is then cooled to a temperature of about 25° C., which may require from one and one-half to two hours, and there ensues a further crystallization of ergosterol.

While the settled material might be again treated with the alcoholic filtrate, it has been found that such additional treatment does not yield a sufficient quantity of crystallized ergosterol to justify. Consequently, the alcoholic filtrate may be distilled for concentration, and the sludge also distilled to recover its alcohol content. The three quantities of crystallized ergosterol, amounting to about 90% of the actual ergosterol content of the yeast which contain decomposition products from yeast may be combined and purified in manner known to those skilled in the art.

Treatment of the yeast may be preceded by an acid hydrolysis occasioned by processing with inorganic acid for example, heating at a temperature of about 100° C., for about an hour with 13% hydrochloric acid. There is thus obtained a somewhat higher, or more effective, extraction of ergosterol during the subsequent phases of the procedure.

It is believed that the high yield of ergosterol obtained in accordance with the hereindescribed procedure is due, to a substantially complete disintegration of the cellular material and hydrolytic splitting of the combined ergosterol by the hot alkali; to the liberation by saponification not only of the ergosterol of the fat but also to liberation of the more firmly combined ergosterol which is in chemical union principally with protein material, and to the attainment of a temperature of from 95 to 100° C. during hydrolysis. The ergosterol combined with protein material constitutes an important part of that which is present in the yeast cell and is in addition to that associated with the fat. The procedures previously utilized failed to free all of the combined or conjugated ergosterol. Hence, the added alcohol contained only that portion of the ergosterol which is present in the yeast fat, and that which is associated with protein material was not extracted by alcohol inasmuch as in this association there is little tendency for it to dissolve.

The former methods entailing a simultaneous saponification and solution of ergosterol, as by treatment with 5% caustic and 40–50% alcohol at 80 to 85° C. yielded about 450 grams of pure ergosterol from 2,000 lbs. of yeast with four cookings. In accordance with the present procedure, and with only two cookings, there is obtained about 1200 grams of pure ergosterol from 2,000 lbs. of yeast, and the time required is about 40% less. Thus, there is obtained an increased yield of over 150% in relation to methods previously utilized.

Furthermore, the solvent employed for treating the caustic liquefied mass may be generally one which is miscible with water but has a large differential solubility with respect to ergosterol at various temperatures. Additionally, the solvent should be one which can readily be recovered by distillation and is not affected by strong alkali.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for extraction of a sterol, which comprises incorporating a solid caustic alkali with a sterol-containing material, permitting liquefaction of the material to take place under the influence of the caustic alkali, heating to effect release of combined sterol then adding to the thus liquefied mass a solvent therefor which is miscible with water and unaffected by alkali, and separating sterol from the solution so obtained.

2. A method for the extraction of ergosterol, which comprises incorporating a solid caustic alkali with yeast, permitting liquefaction of the yeast to take place under the influence of the caustic alkali, heating to effect release of combined ergosterol, then adding to the thus liquefied mass a solvent therefor which is miscible with water and unaffected by alkali, and separating ergosterol from the solution so obtained.

3. A method for extraction of ergosterol, which comprises incorporating a solid caustic alkali with yeast, permitting liquefaction of the yeast to take place under the influence of caustic alkali, cooking thus liquefied yeast at a temperature of from about 90 to 110° C., adding alcohol, heating, allowing suspended material to settle, separating cleared supernatant liquor, and crystallizing ergosterol from said cleared separated liquor.

4. A method for extraction of ergosterol, which comprises incorporating solid caustic soda with yeast, permitting liquefaction of the yeast to take place under the influence of caustic soda, cooking thus liquefied yeast at a temperature from 96 to 104° C., for a period of about three hours, cooling, adding alcohol having a concentration of about 93 to 95%, heating to a temperature of about 78 to 80° C. for about forty-five minutes, allowing suspended material to settle for a period upwards from thirty minutes, decanting cleared supernatant liquor, crystallizing ergosterol from said cleared supernatant liquor, and removing crystallized ergosterol therefrom.

5. A method for the extraction of a sterol, which comprises hydrolyzing a sterol-containing material by treatment with an inorganic acid, incorporating a solid caustic alkali with the thus treated material, permitting liquefaction of the material to take place under the influence of the caustic alkali, heating to effect release of combined sterol, then adding to the thus liquefied mass a solvent therefor which is miscible with water and unaffected by alkali, and separating sterol from the solution so obtained.

6. A method for the extraction of ergosterol, which comprises hydrolyzing yeast by treatment thereof with an inorganic acid, incorporating a solid caustic alkali with the thus treated yeast, permitting liquefaction of the yeast to take place under the influence of the caustic alkali, heating to effect release of combined ergosterol, and then adding an alcohol to the thus liquefied mass, and separating ergosterol from the alcoholic solution so obtained.

ROBERT F. LIGHT.
CHARLES N. FREY.
HERBERT KOTHE.